(12) United States Patent
Kimura et al.

(10) Patent No.: US 10,846,148 B2
(45) Date of Patent: Nov. 24, 2020

(54) REQUEST OF AN MCS LOCK BY GUESTS

(71) Applicant: Hewlett Packard Enterprise Development LP, Houston, TX (US)

(72) Inventors: Hideaki Kimura, Palo Alto, CA (US); Tianzheng Wang, Palo Alto, CA (US); Milind M. Chabbi, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 144 days.

(21) Appl. No.: 15/756,932

(22) PCT Filed: Sep. 10, 2015

(86) PCT No.: PCT/US2015/049304
§ 371 (c)(1),
(2) Date: Mar. 1, 2018

(87) PCT Pub. No.: WO2017/044097
PCT Pub. Date: Mar. 16, 2017

(65) Prior Publication Data
US 2018/0246773 A1 Aug. 30, 2018

(51) Int. Cl.
*G06F 9/46* (2006.01)
*G06F 9/52* (2006.01)

(52) U.S. Cl.
CPC ........ *G06F 9/526* (2013.01); *G06F 2209/521* (2013.01)

(58) Field of Classification Search
CPC .......................... G06F 9/526; G06F 2209/521
See application file for complete search history.

(56) References Cited

U.S. PATENT DOCUMENTS

| 6,173,442 | B1* | 1/2001 | Agesen ............... G06F 9/52 707/999.008 |
| 6,247,025 | B1* | 6/2001 | Bacon ............. G06F 16/2343 |
| 6,965,961 | B1  | 11/2005 | Scott |
| 7,945,912 | B1* | 5/2011 | Nussbaum ........... G06F 9/526 718/104 |
| 8,046,758 | B2  | 10/2011 | Dice |
| 8,458,721 | B2  | 6/2013 | Marathe et al. |
| 8,694,706 | B2  | 4/2014 | Dice et al. |
| 9,996,402 | B2* | 6/2018 | Yadav ................. G06F 9/528 |
| 2003/0200457 | A1* | 10/2003 | Auslander ............ G06F 9/52 726/30 |
| 2005/0050283 | A1 | 3/2005 | Miller et al. |

(Continued)

OTHER PUBLICATIONS

Magnusson, Peter, Anders Landin, and Erik Hagersten. "Queue locks on cache coherent multiprocessors." Proceedings of 8th International Parallel Processing Symposium. IEEE. (Year: 1994).*

(Continued)

*Primary Examiner* — Adam Lee
(74) *Attorney, Agent, or Firm* — Tong, Rea, Bentley & Kim, LLC

(57) ABSTRACT

In example implementations, a method include receiving a request for a lock in a Mellor-Crummey Scott (MCS) lock protocol from a guest user that is context free (e.g., a process that does not bring a queue node). The lock determines that it contains a null value. The lock is granted to the guest user. A pi value is received from the guest user to store in the lock. The pi value notifies subsequent users that the guest user has the lock.

5 Claims, 7 Drawing Sheets

(56) References Cited

U.S. PATENT DOCUMENTS

| | | |
|---|---|---|
| 2007/0136289 A1 | 6/2007 | Adl-Tabatabai et al. |
| 2012/0054394 A1* | 3/2012 | Namjoshi ............... G06F 9/526 710/200 |
| 2012/0226673 A1 | 9/2012 | Li et al. |
| 2015/0074366 A1 | 3/2015 | Calciu et al. |

OTHER PUBLICATIONS

Mellor-Crummey, John M., and Michael L. Scott. "Algorithms for scalable synchronization on shared-memory multiprocessors." ACM Transactions on Computer Systems (TOCS) 9.1: 21-65. (Year: 1991).*

Afek, Y. et al., Software-improved Hardware Lock Elision, (Research Paper), Jul. 15-18, 2014, 10 Pages.

International Searching Authority, The International Search Report and the Written Opinion, dated Jun. 29, 2016, 10 Pgs.

John Kubiatowicz, 'Advanced Operating Systems Structures and Implementation Lecture 8', Computer Science Division at UC Berkeley, Feb. 25, 2013; 9 Pgs.

Johnson, R. et al., A New Look at the Roles of Spinning and Blocking, (Research Paper), Jun. 28, 2009, 6 Pages.

Ma, Z. et al., NUMA Aware Locks Implementation and Evaluation, (Research Paper), 2013, 7 Pages.

Scott, M. L., "Shared-Memory Synchronization," Synthesis Lectures on Computer Architecture 8.2, 2013, pp, 1-221, http://pages.cs.wisc.edu/~markhill/restricted/synthesis_sychronization_draft2012_09.pdf.

* cited by examiner

REQUEST OF AN MCS LOCK BY GUESTS

BACKGROUND

Parallel and shared processing of data is becoming more popular. A pool of memory may be accessed by multiple users to process data. Protocols are established to ensure that one user has access to a particular portion of memory or processor at a time, otherwise errors may occur. The Mellor-Crummey Scott (MCS) lock is one type of locking protocol, among other solutions, that protects shared data.

DETAILED DESCRIPTION

The present disclosure broadly discloses a method for acquiring an MCS lock in a shared memory by a process that does not bring its queue node, referred to herein as a "guest user" of the MCS lock. As discussed above, parallel and shared processing of data is becoming more popular. A pool of memory may be accessed by multiple users to process data. Protocols are established to ensure that one user has access to a particular portion of memory at a time, otherwise errors may occur. The Mellor-Crummey Scott (MCS) lock is one type of locking protocol, among other solutions, that protects shared data.

However, the MCS lock involves each participating process to bring its queue node. Common case users of MCS lock that bring their queue nodes are referred to as "regular" users hereafter. Since a queue node encapsulates the context for each thread to participate in an MCS lock, this document refers to the queue nodes as "contexts." Typically a guest user that does not have context cannot acquire the lock. In one example "a user," whether the user is a guest user or a regular user, is a computing resource (e.g., a thread or a process) that is executing a piece of code (e.g., a function) which uses the lock to access shared data.

The present disclosure provide a MCS guest (MCS-g) lock protocol that allows guest users who are context free (e.g., users who do not bring a queue node) to participate in the mutual exclusion protocol that is otherwise designed for the common case of regular users. In addition, the present disclosure provides a heuristic or method for alleviating priority inversion when two or more groups of regular users are waiting for the lock while a guest user has acquired the lock. Furthermore, the present disclosure provides a heuristic or method to allow the guest user to wait for the lock when a regular user has acquired the lock without allowing other regular users to skip in front of the guest user.

Figure 1:
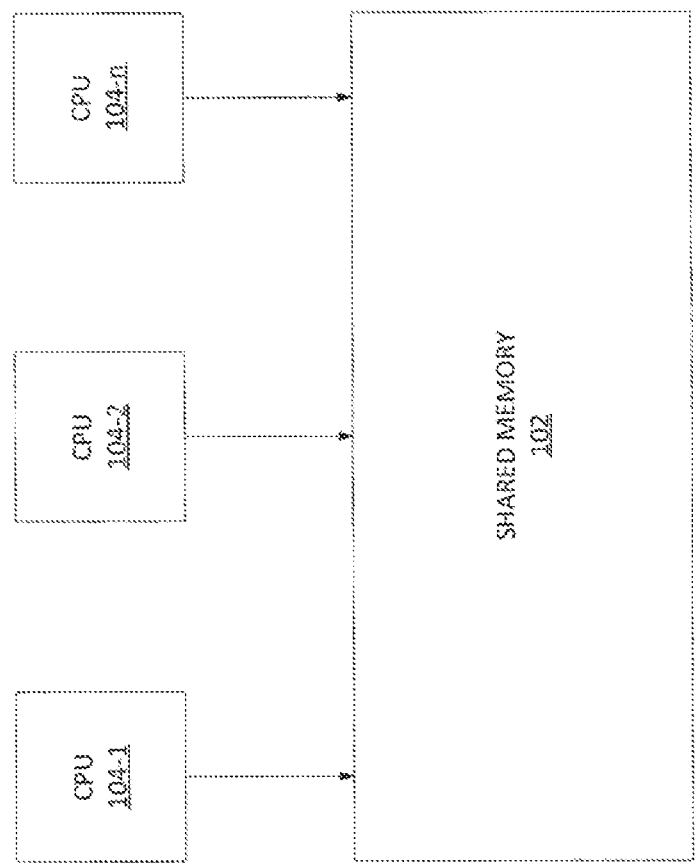
FIG. 1 is a block diagram of an example shared memory that uses an MCS-g lock protocol of the present disclosure.

FIG. 1 illustrates an example system 100 of the present disclosure. The system 100 may include a shared memory 102 and computer processing units (CPUs) or nodes 104-1 to 104-n (hereinafter referred to collectively as CPUs 104 or individually as CPU 104). In one example, the shared memory 102 may be modified with the MCS-g lock protocol described below to ensure that each portion of memory is locked while a user is accessing (e.g., reading or writing) a particular portion of the memory.

In one example, each one of the CPUs 104 may represent a different thread or process that is trying to access the shared memory 102. Some of the CPUs 104 may represent "regular users" that have a context and may arrive and leave at different times. Other CPUs 104 may represent "guest users" that have no context. The MCS-g lock protocol of the present disclosure allows guest users that are context free to access the shared memory 102 while the regular users are arriving and leaving.

Figure 2:
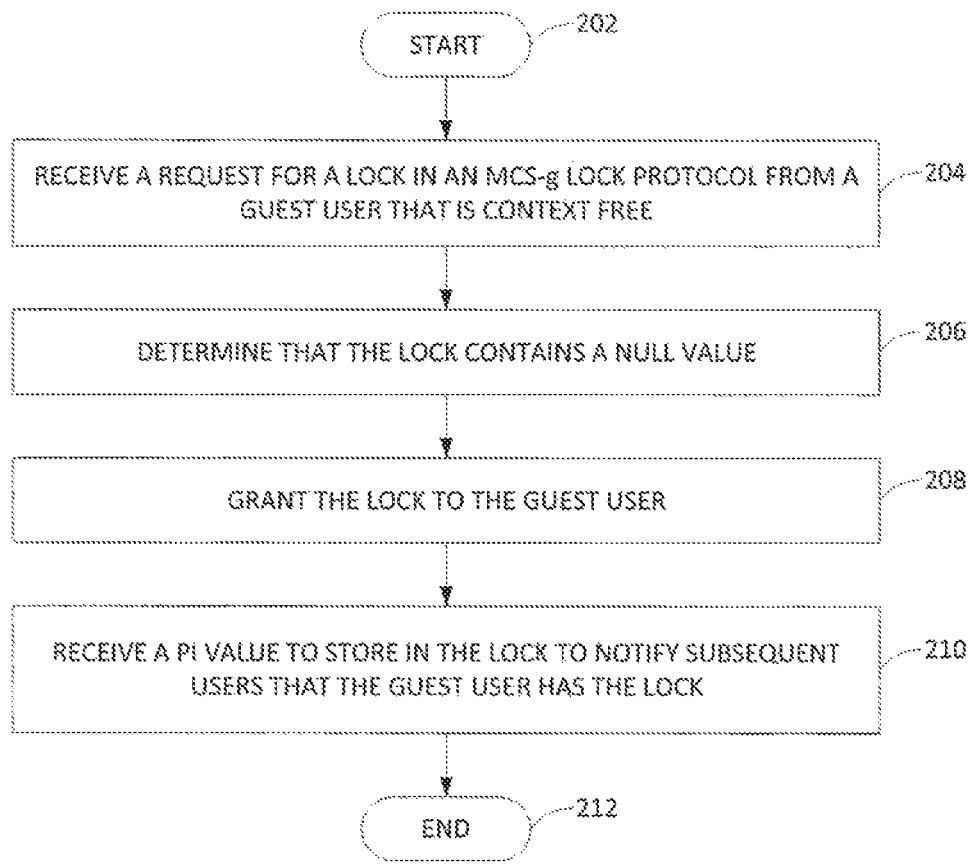
FIG. 2 is a flow diagram of an example method for acquiring a lock in a shared memory by a guest user that is context free.

FIG. 2 illustrates a flow diagram of an example method 200 for acquiring a lock in the shared memory 102 by a guest user that is context free. The method 200 may be performed by a controller or a processor of the shared memory 102.

At block 202, the method 200 begins. At block 204, the method 200 receives a request for a lock in an MCS-g lock protocol from a guest user that is context free. For example, a guest user that does not have a context may arrive at the shared memory that has implemented the MCS-g lock protocol and want to request access to the shared memory. For a regular user, a context may be pre-allocated that is associated with a particular user that includes a flag and a pointer to a successor.

At block 206, the method 200 determines that the lock contains a null value. In one implementation, the lock may be treated like a spinlock for the guest user. Instead of joining a wait queue with other regular users, the guest user may issue a compare and swap (CAS) instruction on the lock word.

At block 208, the method 200 grants the lock to the guest user. In one example, when the lock contains a null value, the lock may be granted to the guest user.

At block 210, the method 200 receives a pi value to store in the lock to notify subsequent users that the guest user has the lock. The subsequent users may be either a regular user or a guest user. In one example, the guest user may change the null value in the lock to a special sentinel value. In one example, the special sentinel value may be a pi value. Although "pi" is provided as an example sentinel value, it should be noted that the sentinel value may be any label that indicates that the lock is acquired by a guest user that is context free.

In one implementation, blocks 206, 208 and 210 may occur as one atomic step. At block 212, the method 200 ends.

Figure 3:
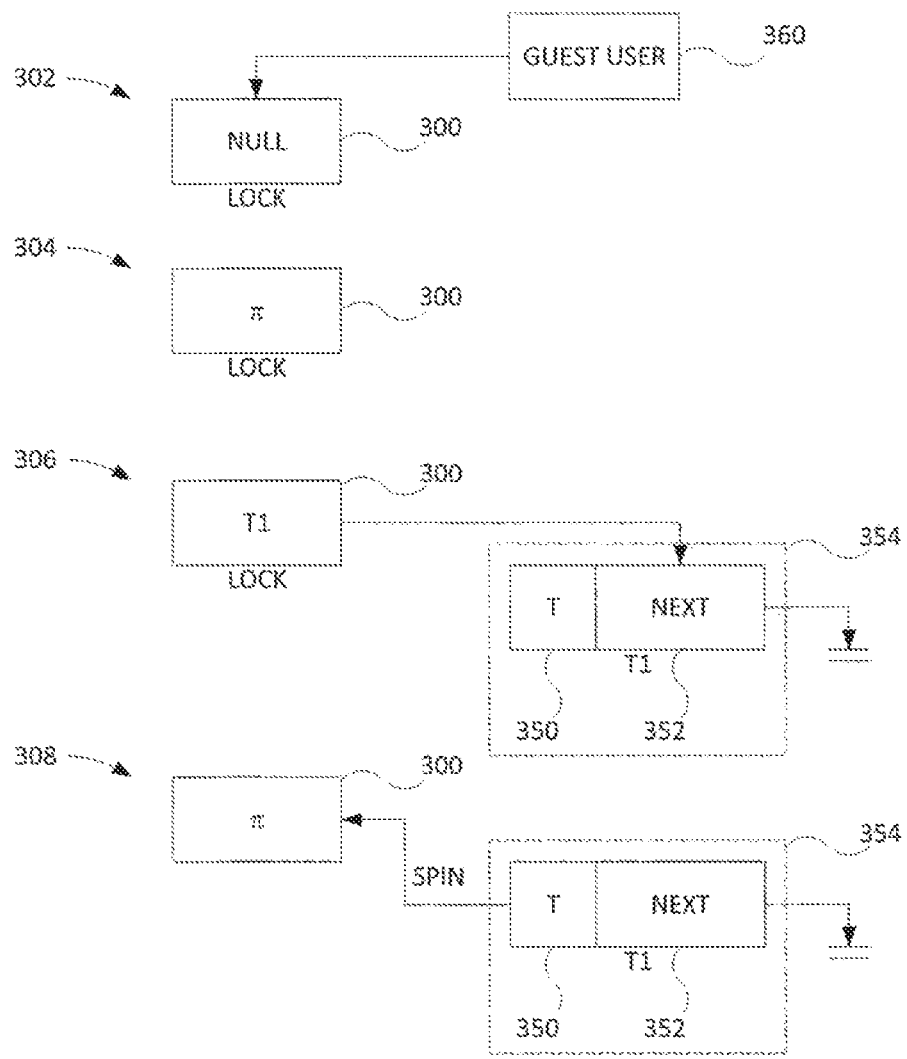
FIG. 3 is an example schematic diagram that illustrates the method for acquiring the lock in the shared memory by the guest user that is context free.

FIG. 3 illustrates an example schematic diagram of the method 200. For example, at block 302 a lock 300 may include a null value. A guest user 360 may try to request the lock 300. When the lock 300 contains a null value, the lock 300 may be granted to the guest user 360.

At block 304, the guest user 360 may perform a CAS instruction to change the null value in the lock 300 into a pi value. The pi value may notify other users (regular users and other guest users) that a guest user 360 has acquired the lock.

At block 306, a regular user T1 having a context may try to obtain the lock 300. In one example, the context may include a flag 350 and a pointer 352. The flag may have a Boolean value (e.g., true (T) or false (F)) regarding whether the lock 300 is already acquired). In one example, the regular user T1 may perform an atomic swap to change the pi value to a next field of the pointer 352. The flag 350 may be set to T as the lock 300 is held on behalf of a different process as indicated by the pi value. The lock 300 may then point to the tail or the last regular user in a queue 354.

At block 308, the regular user T1 atomically swaps the pointer in the lock 300 back to the pi value. The regular user T1 then spins on the lock 300 until the guest user releases the lock 300 and changes the lock 300 back to a null value.

Figure 4:
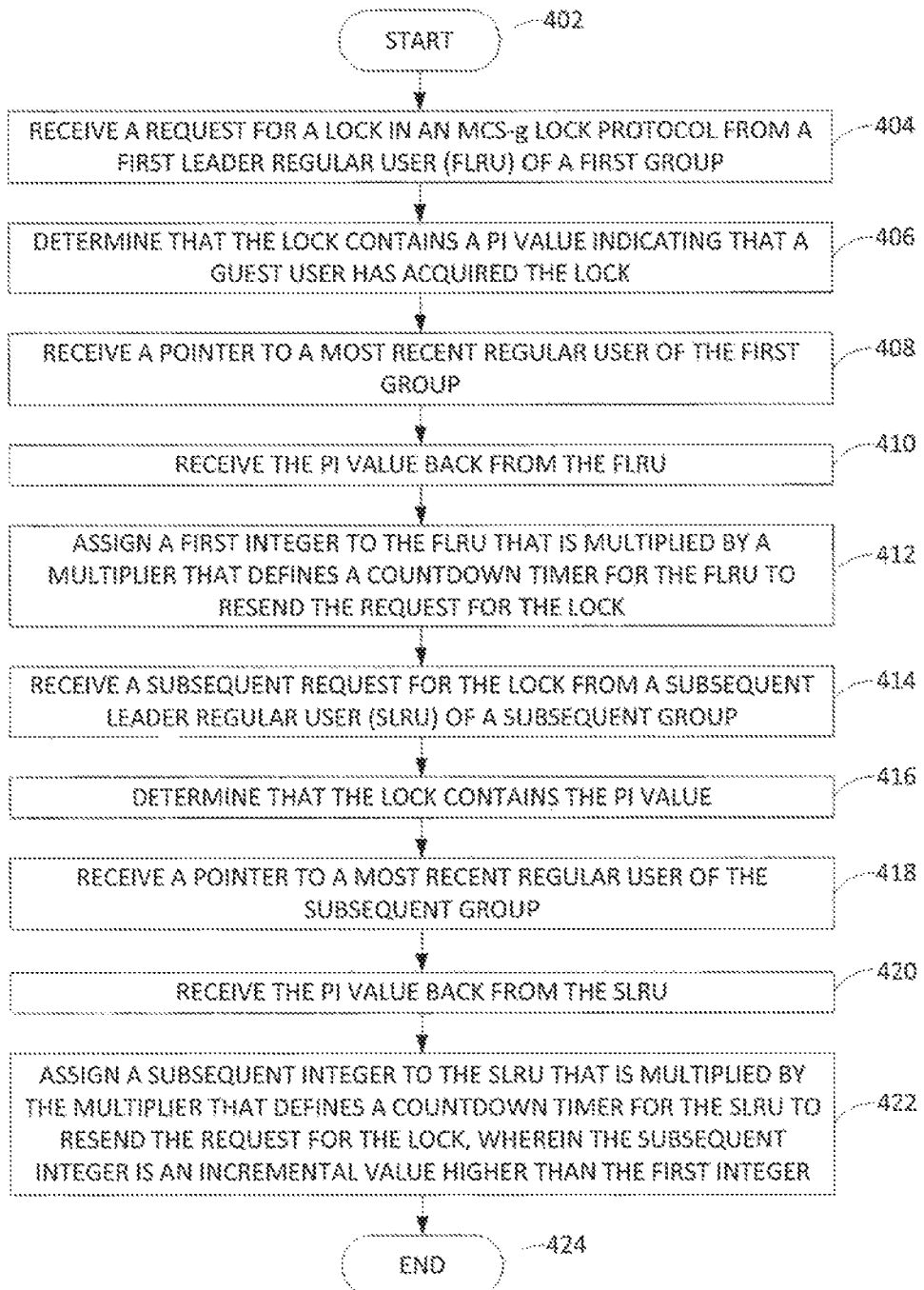
FIG. 4 is a flow diagram of an example method for preventing priority inversion.

FIG. 4 illustrates a flow diagram of an example method 400 for alleviating priority inversion. The method 400 may be performed by a controller or a processor of the shared memory 102.

At block 402 the method 400 begins. At block 404, the method 400 receives a request for a lock in an MCS-g lock protocol from a first leader regular user (FLRU) of a first group. In one example, the first group may include a plurality of regular users that are in the same queue.

At block 406, the method 400 determines that the lock contains a pi value indicating that a guest user has acquired the lock. In one example, the lock may be already acquired by a guest user.

At block 408, the method 400 receives a pointer to a context of a most recent regular user of the first group. For example, if the most recent regular user was the FLRU, the pointer to the context of the FLRU would be received. For example, the lock may point to the next field in the pointer of the FLRU. When another regular user joins the first group after the FLRU, then the pointer to the context of the new regular user would be received, and so forth.

At block 410, the method 400 receives the pi value back from the FLRU. For example, the lock may be changed back from the most recent regular user in the first group to the pi value. In one implementation, the blocks 406 and 408 may occur as a single atomic swap operation.

At block 412, the method 400 assigns a first integer to the FLRU that is multiplied by a multiplier that defines a countdown timer for the FLRU to resend the request for the lock. In one example, the multiplier may be a number of clock cycles of a CPU. The integer may be stored as an extra field in the lock and assigned by the lock. The countdown timer may define an amount of time the FLRU waits before retrying the request for the lock. In other words, the FLRU does not poll the lock during the countdown timer.

At block 414, the method 400 receives a subsequent request for the lock from a subsequent leader regular user (SLRU) of a subsequent group. For example, the lock may be reset to the pi value and another regular user may request the lock. As a result, the SLRU may be in a parallel group with the group of the FLRU.

At block 416, the method 400 determines that the lock contains the pi value. In one example, the lock may still be acquired by the guest user.

At block 418, the method 400 receives a pointer to a context of a most recent regular user of the subsequent group. For example, if the most recent regular user was the SLRU, the pointer to the context of the SLRU would be received. For example, the lock may point to the next field in the pointer of the SLRU. When another regular user joins the subsequent group after the SLRU, then the pointer to the context of the new regular user would be received, and so forth.

At block 420, the method 400 receives the pi value back from the SLRU. For example, the lock may be changed back from the pointer to the pi value.

At block 422, the method 400 assigns a subsequent integer to the SLRU that is multiplied by the multiplier that defines a countdown timer for the SLRU to resend the request for the lock, wherein the subsequent integer is an incremental value higher than the first integer.

In one example, the blocks 414-422 may be repeated for each additional subsequent request for the lock that is received from additional subsequent leader regular users. In one example, the integer may be incremented by an integer value for each additional group leader that tries to acquire the lock. For example, the FLRU may have an integer value of 1, the SLRU may have an integer value of 2, the additional SLRU may have an integer value of 3, and so forth. In one example, the integer may be incremented using an atomic add operation or a non-atomic operation.

As a result, the method 400 provides a method that alleviates priority inversion. For example, without the method 400, the SLRU could acquire the lock before the FLRU when the guest user releases the lock. As a result, the regular users in the queue of the SLRU would obtain the lock before the regular users in the queue of the FLRU, even though the regular users in the queue of the FLRU arrived before the regular users in the queue of the SLRU.

The integer values multiplied by the multiplier provide an opportunistic linear back-off that can alleviate this priority inversion. In some implementations, the integer value may be reset to zero when a regular user acquires the lock. At block 424, the method 400 ends.

Figure 5:
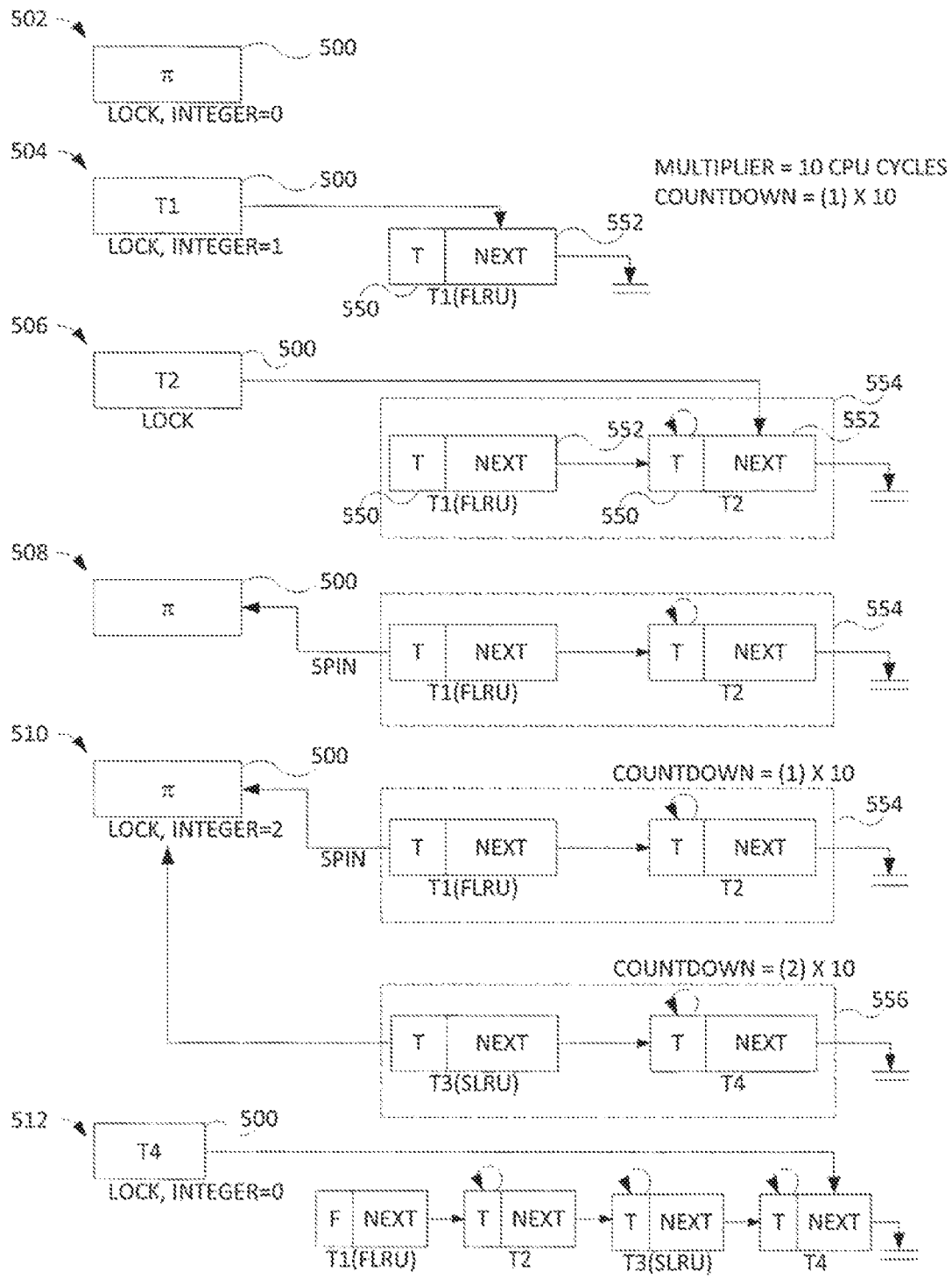
FIG. 5 is an example schematic diagram that illustrates the method for preventing priority inversion.

FIG. 5 illustrates an example schematic diagram of the method 400. For example, at block 502 the lock 500 contains a pi value and a guest user has already acquired the lock.

At block 504, a regular user T1 (also referred to as the FLRU since T1 is the first regular user to request the lock 500 after it is acquired by a guest user) requests the lock 500. The regular user T1 may perform an atomic swap operation to change the lock 500 to a reference to the context (e.g., the context including the flag 550 and the pointer 552) of T1. The regular user T1 may see that the lock has been acquired by a guest user as indicated by the pi value and set a flag 550 to T. The lock 500 may then point to the context of T1.

The lock 500 may assign the FLRU an integer value of 1. The multiplier may be 10 CPU cycles. Thus, in one example, the countdown timer may be 10 CPU cycles. It should be noted that the numerical values are provided as examples and any value may be used as the multiplier.

At block 506, a second regular user T2 may enter a queue 554 of the FLRU. T2 performs an atomic swap operations to change the lock 500 to reference its context (e.g., the context including the flag 550 and the pointer 552). The regular user T2 may see that T1 is its predecessor and set a flag 550 of T2 to T. Then the regular user T2 may install a reference to itself (T2) into a next field in the pointer 552 of T1. T1 may proceed to the next step by swapping the lock 500 and without waiting for T2 to set the flag and install T2 into TVs next field.

At block 508, T1 may change the lock back to the pi value from the pointer in block 506. T2 may then spin on the flag 550. The FLRU (T1) may spin on the lock 500.

At block 510, another regular user T3 may request to acquire the lock 500 after the lock 500 was reset in block 508. Thus, the regular user T3 may be the SLRU for a new group of regular users in a queue 556. The regular users T3 and T4 may perform similar operations as T1 and T2 in blocks 504-508.

The lock 500 may assign an integer value of 2 to the SLRU (T3). Thus, the countdown timer value for the SLRU may be 20 CPU clock cycles. As a result, the FLRU may attempt to re-request the lock 500 more frequently and sooner than the SLRU. Thus, the FLRU will most likely obtain the lock 500 before the SLRU once the guest user releases the lock 500.

At block 512, the guest user releases the lock 500 and the FLRU obtains the lock 500. Thus, the queue 554 and 556 are merged into a single queue of regular users T1, T2, T3 and T4 in the order that the regular users arrived. The lock 500 points to the tail T4 and the lock integer is reset to 0 until another guest user acquires the lock 500 and the blocks 502-512 are repeated.

Figure 6:
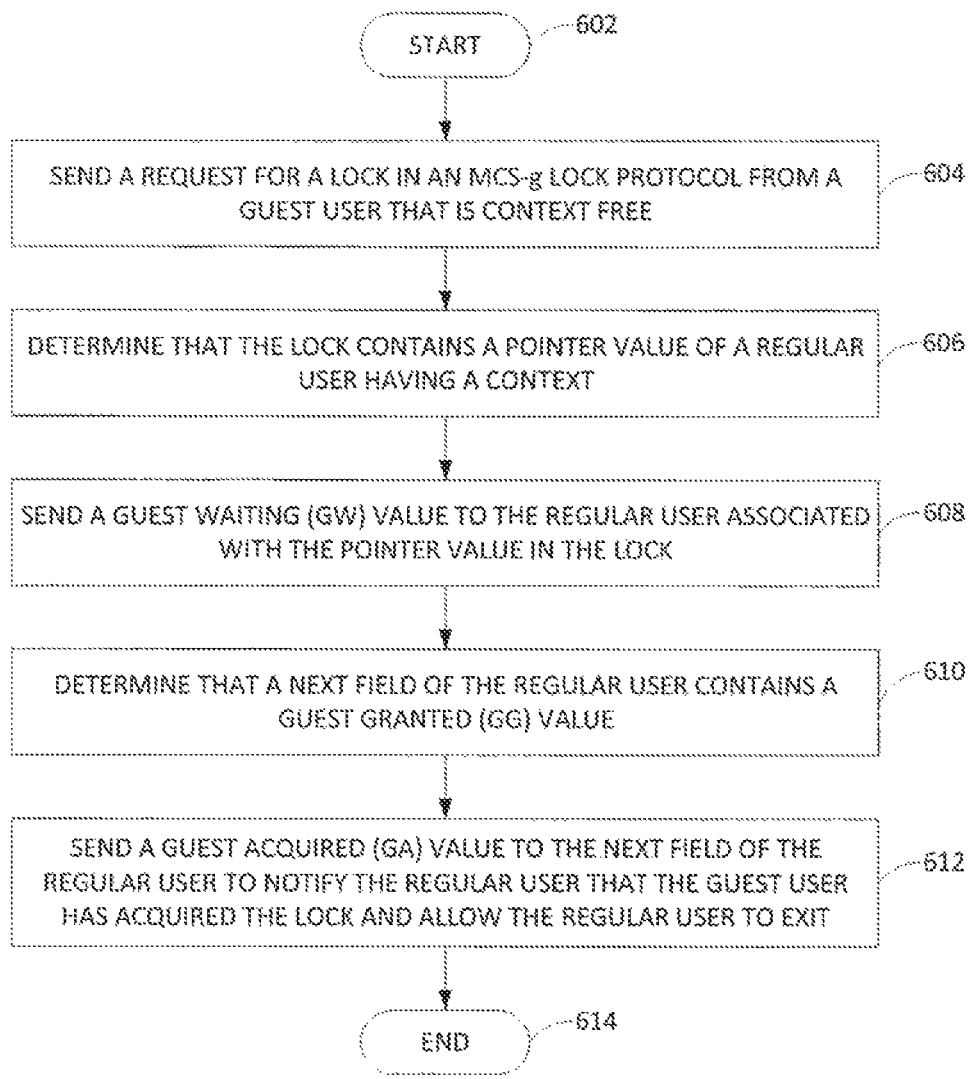
FIG. 6 is a flow diagram of an example method for a guest user that is context free waiting for a lock of the shared memory.

FIG. 6 illustrates a flow diagram of example method 600 for a guest user that is context free waiting for a lock of the shared memory. The method 600 may be performed by a guest user accessing the shared memory.

At block 602, the method 600 begins. At block 604, the method 600 sends a request for a lock in an MCS-g lock protocol from a guest user that is context free. For example, a guest user may try to obtain the lock to access the shared memory.

At block 606, the method 600 determines that the lock contains a pointer value of a regular user having a context. In one example, the guest user may perform an atomic swap operation on the lock to ensure that the pointer value is obtained.

In contrast, if a CAS operation was performed by the guest user, the CAS operation could fail. As a result, the guest user would wait to re-attempt the CAS operation. A regular user may request the lock and jump in front of the guest user while the guest user is waiting. As a result, the guest user could potentially have to wait indefinitely. Thus, the atomic swap operation ensures that the guest user obtains the pointer and begins a process to reserve the guest user's place in line for the lock.

At block 608, the method 600 sends a guest waiting (GW) value to the regular user associated with the pointer value in the lock. For example, the guest user may perform an atomic swap operation with a pi value on the lock and obtain the information of the regular user that is the tail of the queue or last in line in the queue. The guest user may install a GW value in a next field of the pointer of the regular user identified from the information that was swapped from the lock. As a result, the regular user that is last in line may be notified that a guest user is waiting in line for the lock and that the regular user should pass the lock to the guest user once the regular user is finished accessing the shared memory.

At block 610, the method 600 determines that a next field of the regular user contains a guest granted (GG) value. In one implementation, the user that holds the lock that noticed a GW in the next field is the user that changes it to the GG value. In one example, the regular user that is last in line may replace the pointer value in the lock queue node's next field with the GG value. The GG value notifies the guest user that the lock is available for the guest user.

At block 612, the method 600 sends a guest acquired (GA) value to the next field of the regular user to notify the regular user that the guest user has acquired the lock and allow the regular user to exit. For example, the guest user may acquire the lock and provide a GA value to the lock. The regular user may spin on the lock until the GA value is obtained notifying the regular user that the guest user has successfully acquired the lock. The regular user may then exit the queue.

As a result, the method 600 allows a guest user to "reserve" a place in line behind the last regular user in the queue. Thus, subsequent regular users that arrive after the guest user do not jump in front of the guest user while periodically re-requesting the lock.

It should be noted that the label of the values GW, GG and GA are examples. In other words, the indicators may be any label (e.g., numerical values, Greek symbols, and the like) that convey transition states that the guest is waiting for the lock, the guest is granted the lock and that the guest has acquired the lock. At block 614, the method 600 ends.

Figure 7:
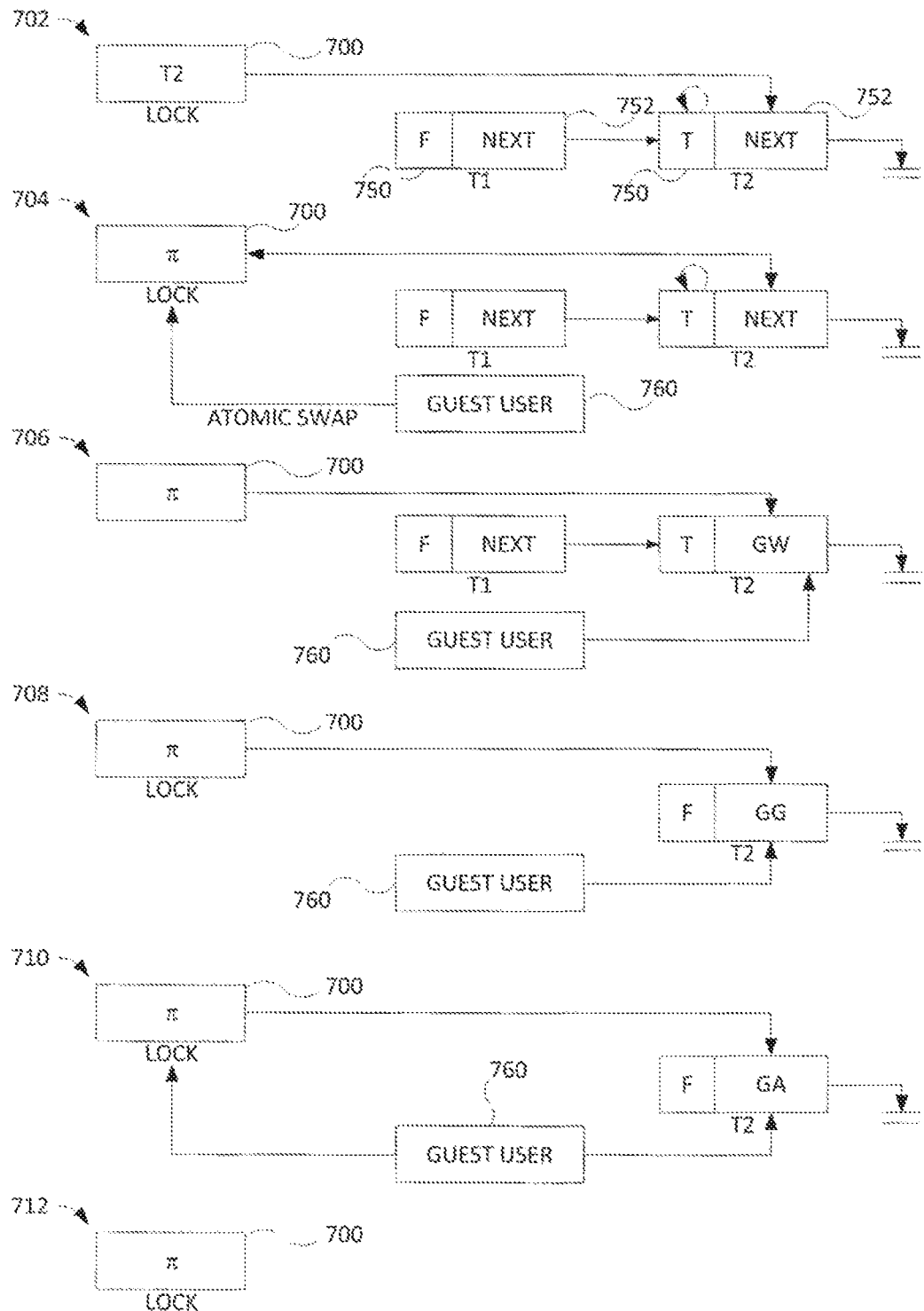
FIG. 7 is an example schematic diagram that illustrates the method for the guest user that is context free waiting for the lock.

FIG. 7 illustrates an example schematic diagram of the method 600. For example, at block 702 the regular user T1 has acquired the lock 700 as indicated by the flag 750 being set to F. The lock 700 points to the context of the regular user T2. The regular user T2 spins on the flag 750 while it waits for the lock 700 to be passed from T1.

At block 704, a guest user 760 arrives and requests the lock 700. The guest user 760 may perform an atomic swap operation with a pi value on the lock 700 to ensure that the pointer value in the lock 700 is received by the guest user 760. The guest user 760 sees that the lock 700 points to a regular user T2.

At block 706, the guest user 760 sends a GW value to the regular user T2. The next field of the pointer 752 is changed to GW to notify the regular user T2 that the guest user 760 is waiting in line for the lock 700 after the regular user T2. The guest user 760 may spin on the next field of the pointer 752 of T2.

At block 708, the regular user T1 may have finished accessing the shared memory and passed the lock 700 to the regular user T2. The regular user T2 may have the lock 700 as indicated by the flag 750 of T2 being set from T to F. When the regular user T2 is finished accessing the shared memory, the regular user T2 may change the next field in the pointer to a GG value.

At block 710, the guest user 760 may see the transition of the next field in the pointer 752 of T2 that it is spinning on from GW to GG and acquire the lock 700. The guest user 760 may change the value of the next field of the pointer 752 of T2 to the GA value. The regular user T2 may see the GA value to be notified that the guest user 760 has successfully acquired the lock 700. The regular user T2 may then depart with its context.

At block 712, since the lock 700 has a pi value, it indicates the presence of the guest user 760. When subsequent users arrive in the queue, the methods 200 or 400 may be applied.

In one example, when the guest user 760 is finished with the lock 700 and ready to release the lock 700, the guest user 760 may perform a CAS operation on the lock 700. The CAS operation may change the pi value in the lock 700 back to a null value.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:
   receiving a request for a lock in a Mellor-Crummey Scott (MCS) lock protocol from a first leader regular user of a first group;
   determining that the lock contains a sentinel value indicating that a guest user has acquired the lock;
   receiving a pointer to a most recent regular user in the first group;

receiving the sentinel value back from the first leader regular user, wherein the first leader regular user spins on the lock until the sentinel value is changed to a null value;

assigning a first positive integer to the first leader regular user that is multiplied by a positive multiplier that defines a countdown timer for the first leader regular user to resend the request for the lock;

receiving a subsequent request for the lock from a subsequent leader regular user of a subsequent group;

determining that the lock contains the sentinel value;

receiving a pointer to a most recent regular user in the subsequent group;

receiving the sentinel value back from the subsequent leader regular user, wherein the subsequent leader regular user spins on the lock until the sentinel value is changed to the null value; and assigning a subsequent positive integer to the subsequent leader regular user that is multiplied by the positive multiplier that defines a countdown timer for the subsequent leader regular user to resend the subsequent request for the lock, wherein the subsequent positive integer is an incremental value higher than the first integer.

2. The method of claim 1, wherein the first group and the subsequent group comprise a plurality of regular users in parallel queues.

3. The method of claim 1, wherein the first integer is set to zero when the guest user releases the lock.

4. The method of claim 1, wherein the multiplier is a duration of a number of computer processing unit (CPU) cycles.

5. The method of claim 1, wherein the determining, the receiving the pointer of the subsequent leader regular user, the receiving the sentinel value back from the subsequent leader regular user, and the assigning the subsequent integer are repeated for each additional subsequent request for the lock that is received from additional subsequent leader regular users.

* * * * *